United States Patent
Pehrsson

(10) Patent No.: US 12,498,076 B2
(45) Date of Patent: Dec. 16, 2025

(54) METHOD OF PLATING AN AUTOMOTIVE EXHAUST PIPE

(71) Applicant: Dynaflex Products, Commerce, CA (US)

(72) Inventor: Cory Pehrsson, Huntington Beach, CA (US)

(73) Assignee: Dynaflex Products, Commerce, CA (US)

( * ) Notice: Subject to any disclaimer, the term of this patent is extended or adjusted under 35 U.S.C. 154(b) by 533 days.

(21) Appl. No.: 17/847,982

(22) Filed: Jun. 23, 2022

(65) Prior Publication Data

US 2023/0417357 A1    Dec. 28, 2023

(51) Int. Cl.
| | |
|---|---|
| *F16L 58/08* | (2006.01) |
| *C23C 18/32* | (2006.01) |
| *C23C 28/02* | (2006.01) |
| *C23F 17/00* | (2006.01) |
| *C25D 3/04* | (2006.01) |
| *C25D 7/04* | (2006.01) |

(52) U.S. Cl.
CPC ............... *F16L 58/08* (2013.01); *C23C 18/32* (2013.01); *C23C 28/023* (2013.01); *C23F 17/00* (2013.01); *C25D 3/04* (2013.01); *C25D 7/04* (2013.01)

(58) Field of Classification Search
CPC ........ F16L 58/08; C23C 18/32; C23C 28/023; C23F 17/00; C25D 3/04; C25D 7/04
USPC ........................................................ 138/146
See application file for complete search history.

(56) References Cited

U.S. PATENT DOCUMENTS

| | | | | |
|---|---|---|---|---|
| 6,500,565 | B2 * | 12/2002 | Usui ................... | F16L 58/1054 138/146 |
| 2004/0115462 | A1 * | 6/2004 | Grady ................... | C23C 28/023 428/615 |
| 2006/0026952 | A1 * | 2/2006 | Takahashi .............. | C25D 5/627 60/299 |
| 2006/0037660 | A1 * | 2/2006 | Kinnally ............. | F16L 58/1054 138/146 |
| 2006/0213569 | A1 * | 9/2006 | Sasai ..................... | F16L 11/045 29/527.1 |
| 2009/0098289 | A1 * | 4/2009 | Deininger ........... | C23C 18/1225 427/236 |
| 2013/0206271 | A1 * | 8/2013 | Wieser .................... | F01N 13/16 138/143 |

(Continued)

OTHER PUBLICATIONS

RCMoment Inc., 2062 Nickel Plating Aluminum Exhaust Pipe for monster trucks, https://www.rcmoment.com/p-rm6503.html, 2016, 7 pages.

*Primary Examiner* — David R Deal
(74) *Attorney, Agent, or Firm* — Fish IP Law, LLP

(57) ABSTRACT

A method of protecting a metal pipe from corrosion, comprises depositing a layer of nickel composition over both inside and outside of the pipe, and depositing a layer of chrome over the nickel composition on the outside of the pipe. The nickel composition is preferably deposited using an electroless plating, and the chrome is preferably deposited using electroplating. Pipes coated using these methods are particularly useful for sections of exhaust system of a diesel engine having a particulate filter and a selective catalytic reduction system upstream of the coated pipes sections. Straight, bent, and "Y" pipe sections are all contemplated, including large pipes having inside diameters of 4"-8".

10 Claims, 3 Drawing Sheets

(56) References Cited

U.S. PATENT DOCUMENTS

2018/0087155 A1* 3/2018 Subramani .............. C23C 28/42
2020/0232109 A1* 7/2020 Hoffman ............... C23C 14/046

* cited by examiner

METHOD OF PLATING AN AUTOMOTIVE EXHAUST PIPE

FIELD OF THE INVENTION

The field of the invention is exhaust apparatus for internal combustion engines (F01N)

BACKGROUND

The following description includes information that may be useful in understanding the present invention. It is not an admission that any of the information provided herein is prior art or relevant to the presently claimed invention, or that any publication specifically or implicitly referenced is prior art.

Some newer exhaust systems for internal combustion engines use various techniques directed at preventing release of hydrocarbon particulates from exhaust gasses. Such systems have beneficial environmental effects, but can also damage the inside of exhaust pipes, both by depleting the otherwise protective coating of hydrocarbons, and by introducing corrosive sulfuric and possibly other acids.

The outside of exhaust pipes of internal combustion engines are often coated with nickel or chrome. This provides an aesthetic benefit, and well as protection against corrosion. Given the high cost of these coating materials, and the lack of any perceived benefit for coating the insides (lumen) of exhaust pipes, the prior art has apparently only coating the outside of the pipes. Since electroless plating would coat both insides and outsides of a pipe, such coatings have used electroplating.

Accordingly, the existing systems and methods are inadequate for protecting exhaust pipes of newer exhaust systems that have reduced hydrocarbon exhaust gasses.

SUMMARY OF THE INVENTION

The inventive subject matter provides apparatus, systems, and methods in which the inside and the outside of at least a portion of an exhaust pipe is electrolessly plated with a nickel composition, and then the outside is further electroplated with chromium, In preferred embodiments, the pipe comprises an alloy of carbon steel, and nickel composition is deposited directly over the carbon steel, and the chrome is deposited directly over the nickel. All size exhaust pipes are contemplated, although the inventive subject matter is thought be particularly beneficial for pipes having an inside diameter of 4"-8", and even more particularly for pipes have an inside diameter of 4"-8" at a bend region, and where the pipe has a "Y" configuration.

All suitable thicknesses of nickel and chrome are contemplated, and as is common with such coating processes, the thicknesses vary in curves, at edges and corners, and even on regularly curved regions. Nevertheless, in preferred embodiments the nickel layer is considerably thicker than the chrome layer, such that in at least some regions, e.g., a 1 in² region, the chrome layer has thickness of between 0.001 and 0.01 times a thickness of the first layer of nickel.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
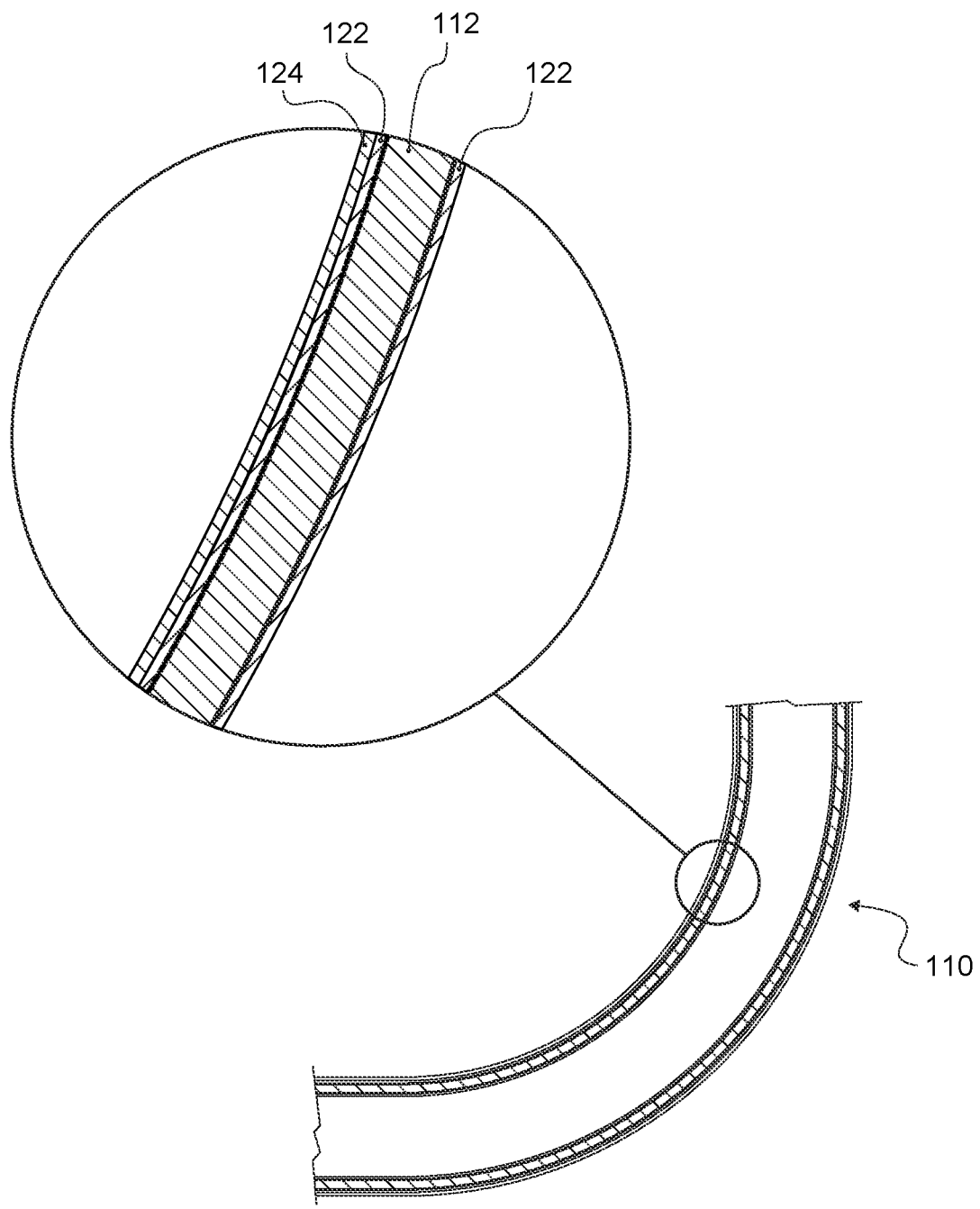
FIG. 1 is a cross-sectional view of a bent portion of an exhaust pipe, showing nickel coating on the inside, and coatings of nickel and chromium on the outside.

The inventive subject matter provides apparatus, systems, and methods in which the inside and the outside of at least a portion of an exhaust pipe is electrolessly plated with a nickel composition, and then the outside is further electroplated with chromium, In FIG. 1, a bent portion of an exhaust pipe 110 of an internal combustion engine. Exhaust pipe 110 has a wall 112 that defines lumen 114. The inside of the wall 112 is coated with a layer of nickel and phosphorous (referred to herein as a layer or coating of nickel) 122. The outside of the wall 112 is also coated with the layer of nickel 122, and also has a layer of chrome 114 on top of the nickel 122.

Pipe 110 is preferably made of carbon steel, although all other suitable alloys are contemplated. Coating carbon steel is important because that material is particularly susceptible to acidic gasses passing through some modern exhaust systems.

All size exhaust pipes are contemplated, and pipe 110 should be interpreted generically to include pipes having an inside diameter of 4"-8".

In preferred embodiments, the layer of nickel 122 is coated directly on the wall 112 of the pipe 110. Deposition of the nickel layer 122 is accomplished by electroless deposition, which provide a thicker layer than would normally be provided by electrolytic deposition techniques. The electroless deposition of nickel can advantageously be accomplished according to the following protocol:

A. Clean the pipe if needed to remove dirt, oils, and soaps from the surface. Effective cleaning of the substrate is necessary to ensure proper adhesion of the nickel plating.

B. At least partially submerge the pipe 110 into a plating bath that includes positively charged nickel-phosphorus. An autocatalytic chemical reaction will automatically draw the dissolved nickel ions onto the wall 112 of the pipe 110.

C. Use a chemical reducing agent, such as sodium hypophosphite, to reduce the positively charged nickel ions to produce the nickel layer 122.

In some embodiments, the nickel layer 112 is deposited by the catalytic reduction of nickel ions with sodium hypophosphite in acid baths at pH 4.5-5.0 at a temperature of 85-95° C. The level of phosphorous in the nickel layer 122 can be altered according to techniques known to the industry. Low-phosphorous plating has approximately 2 to 5% phosphorous content, and provides the hardest coating. Medium-phosphorous plating has about 6 to 9% phosphorous content, provides a softer coating, but plates faster. High-phosphorous plating has around 10 to 13% phosphorous content. Baking can increase hardness, but can also reduce protection from corrosion.

Nickel layer 112 can advantageously be deposited to have a thickness of 12 to 25 microns (0.0005" to 0.001") and typically does not require further surface finishing, machining, or grinding after plating.

All suitable thicknesses of nickel and chrome are contemplated, and as is common with such coating processes, the thicknesses vary in curves, at edges and corners, and even on regularly curved regions.

Chrome layer 114 is preferably deposited only on the outside of pipe 110, using an electrolytic application process. In some embodiments the process is as follows:

A. If needed clean the outside of the nickel-coated pipe.
B. Position spaced apart electrodes onto the nickel layer 112, and submerge the nickel-coated pipe into a vat containing chrome particles dispersed in a liquid.
C. Apply an electric current between the positioned electrodes and the chrome-containing liquid until a desired thickness is reached.

The chrome layer 114 can be any desired thickness, but it preferably much thinner than the nickel layer 112. In some embodiments the chrome layer 114 could be considered a very thin "flash". In least some regions, e.g., a 1 $in^2$ region 130, the chrome layer 114 has thickness of between 0.001 and 0.01 times a thickness of the first layer of nickel.

Figure 2:
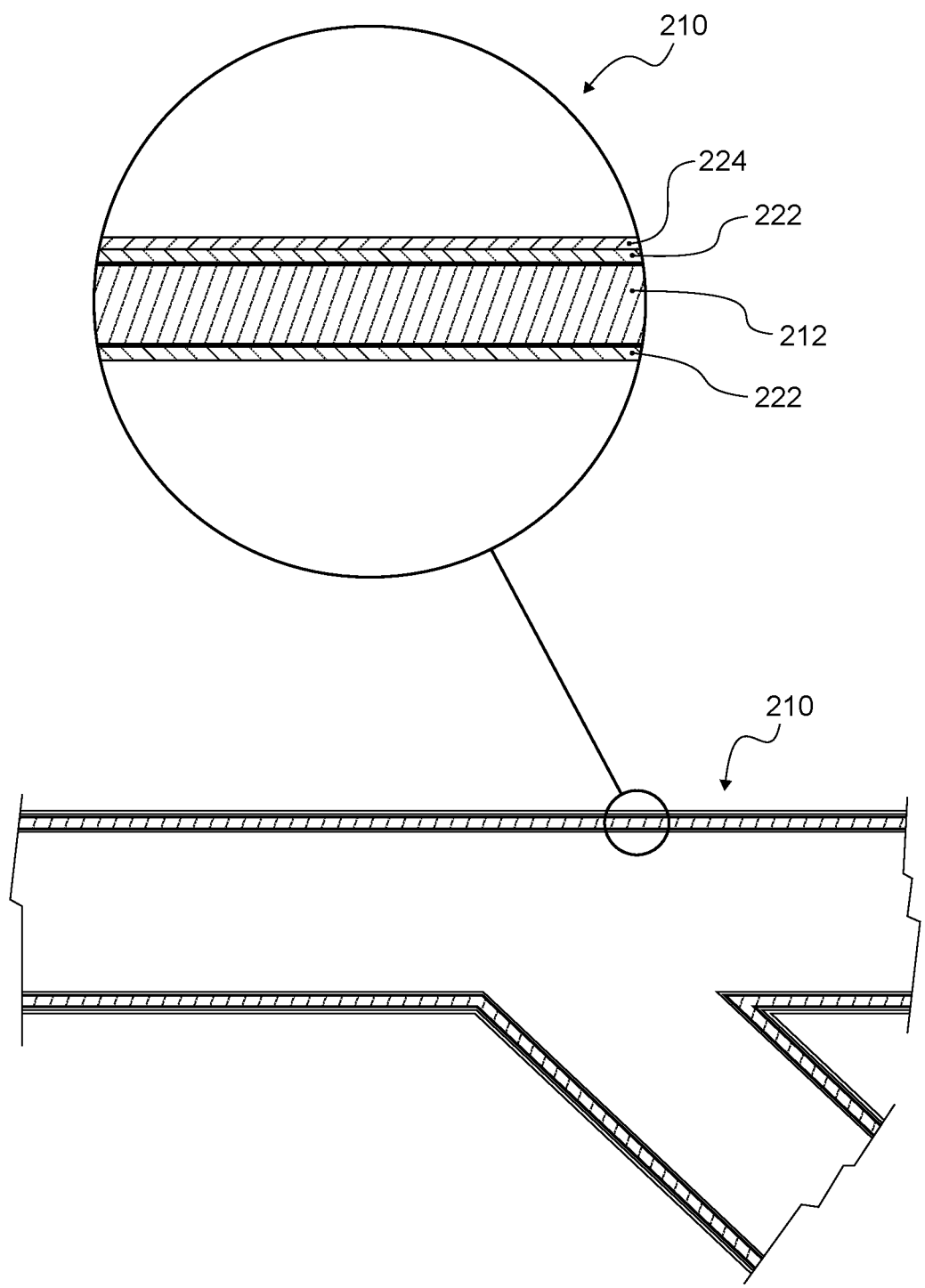
FIG. 2 is a cross-sectional view of a "Y" portion of an exhaust pipe, showing nickel coating on the inside, and coatings of nickel and chromium on the outside.

FIG. 2 is a cross-sectional view of a "Y" portion of an exhaust pipe 210, showing nickel layer 212 on the inside and outside of the exhaust pipe 210, and a chromium layer 214 on the outside.

Figure 3:
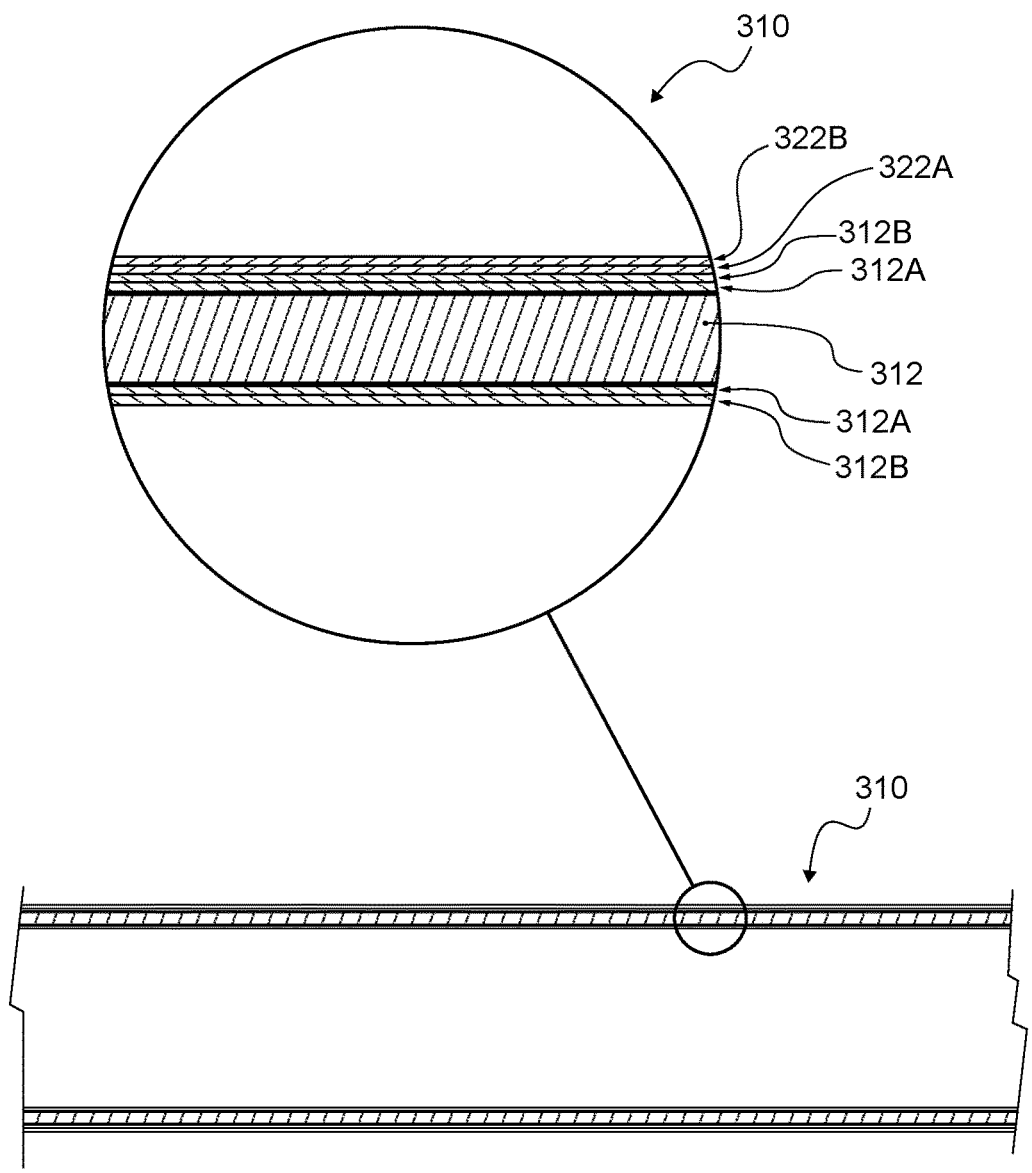
FIG. 3 is a cross-sectional view of a straight portion of an exhaust pipe, in which the inside of the pipe has a double coating of nickel, and the outside of the pipe has a double coating of nickel and chromium.

FIG. 3 is a cross-sectional view of a straight portion of an exhaust pipe 310, in which the inside of the pipe has a double coating of nickel 312A, 312B, and the outside of the pipe has a double coating of nickel 312A, 312B, and double coating of chromium 322A, 322B

The recitation of ranges of values herein is merely intended to serve as a shorthand method of referring individually to each separate value falling within the range. Unless otherwise indicated herein, each individual value is incorporated into the specification as if it were individually recited herein, and ranges include their endpoints.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An exhaust pipe for an internal combustion engine, the exhaust pipe comprising:
    a first coating over (a) an inside of at least a portion of the exhaust pipe, and (b) an outside of the portion of the exhaust pipe, the first coating comprising electrolessly plated nickel; and
    a second coating over the first coating on the outside of the portion of the exhaust pipe, the second coating comprising chrome.

2. The exhaust pipe of claim 1, wherein the first coating includes phosphorous.

3. The exhaust pipe of claim 1, wherein the exhaust pipe comprises a steel alloy, and the first coating juxtaposes the steel alloy on both inside and outside surfaces of the exhaust pipe.

4. The exhaust pipe of claim 1, wherein the chrome of the second coating juxtaposes the first coating.

5. The exhaust pipe of claim 1, wherein the outside of the portion of the exhaust pipe has at least one square inch in which the chrome in the second coating has an average thickness of between 0.001 and 0.01 times an average thickness of the nickel in the first coating.

6. The exhaust pipe of claim 1, further comprising a third coating comprising nickel over the second coating comprising chrome, and a fourth coating comprising chrome over the third coating comprising nickel.

7. The exhaust pipe of claim 1, wherein the portion of the exhaust pipe has a non-linear region with an inside diameter of 4"-8".

8. The exhaust pipe of claim 1, wherein the portion of the exhaust pipe has a bend of between 90° and 100°.

9. The exhaust pipe of claim 1, wherein the portion of the exhaust pipe includes a "Y" joint.

10. The exhaust pipe of claim 1, wherein the chrome of the second coating is electroplated chrome.

\* \* \* \* \*